R. H. BARBOUR.
FLEXIBLE ELECTRICAL BRUSH OR COLLECTOR.
APPLICATION FILED SEPT. 12, 1910.

990,951.

Patented May 2, 1911.

UNITED STATES PATENT OFFICE.

RALPH HENRY BARBOUR, OF TILTWOOD, ENGLAND.

FLEXIBLE ELECTRICAL BRUSH OR COLLECTOR.

990,951.  Specification of Letters Patent. Patented May 2, 1911.

Application filed September 12, 1910. Serial No. 581,710.

*To all whom it may concern:*

Be it known that I, RALPH HENRY BARBOUR, a subject of His Majesty the King of Great Britain, residing at Tiltwood, Crawley Down, Sussex, England, electrical engineer, have invented a certain new and useful Improvement in and Relating to Flexible Electrical Brushes or Collectors; and I do hereby declare the following to be a full, clear, and exact description of the invention, such as will enable others skilled in the art to which it appertains to make and use the same.

The present invention relates to constructional improvements in that class of electrical brush or collector which consists of a tape or cord, such as braided wire for example, which is held at its ends so as to lie stretched over the periphery of a rotating conductor or collector ring.

Figure 1:
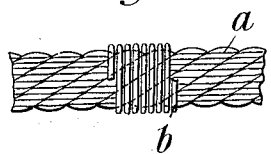
Figure 2:
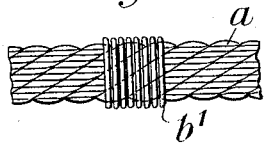

In the annexed drawing Figure 1 shows in elevation a portion of a flexible brush in accordance with my invention having a cover or armoring consisting of wire wound around the core, the cover being partly removed to show the core, and Fig. 2 is a similar view but showing a cover or armoring consisting of rings slipped on the core.

*a* is the core of very fine copper or other wire stranded or otherwise formed into a tape or cord; (these individual wires are too small to show separately in the drawing—each of the smallest cords illustrated in the stranded core contains about 200 wires); and *b* is a wire of very much larger gage wound around the core *a* to provide the cover or armoring thereto.

*b'* Fig. 2 indicates rings slipped over the core *a* so as to lie close to one another and provide the cover or armoring.

I prefer that the turns of the helical armoring *b* Fig. 1, and the rings *b'* Fig. 2, should be just slightly separated as shown in the drawing, in order that the flexibility of the core may be better preserved.

What I claim and desire to secure by Letters Patent of the United States is:—

In an electrical brush or collector, the combination with the core comprising a plurality of fine wire strands of high electrical conductivity, of an encircling armor for the core comprising metallic strands which are good collectors of electric current, said last named strands being spaced from each other and of appreciably larger gage than those of the core.

In testimony whereof I have hereunto set my hand in the presence of two witnesses.

RALPH HENRY BARBOUR.

Witnesses:
RIPLEY WILSON,
A. W. BISHOP.

Copies of this patent may be obtained for five cents each, by addressing the "Commissioner of Patents, Washington, D. C."